(12) United States Patent
Acharya et al.

(10) Patent No.: US 8,819,000 B1
(45) Date of Patent: Aug. 26, 2014

(54) QUERY MODIFICATION

(75) Inventors: Anurag Acharya, Los Angeles, CA (US); Alexandre A. Verstak, Cupertino, CA (US)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 13/461,315

(22) Filed: May 1, 2012

Related U.S. Application Data

(60) Provisional application No. 61/482,016, filed on May 3, 2011.

(51) Int. Cl.
*G06F 17/30* (2006.01)

(52) U.S. Cl.
CPC ..................... *G06F 17/30* (2013.01)
USPC ........... 707/723; 707/731; 707/748; 707/766; 707/770

(58) Field of Classification Search
CPC .......... G06F 17/00; G06F 17/30; G06F 3/12; G06F 17/21; G06F 17/18
USPC ................. 707/705–711, 720–723, 728–731, 707/748–754, 758–759, 765–767, 713, 766, 707/770; 709/203, 206, 215–220; 715/737–739, 968
See application file for complete search history.

(56) References Cited

U.S. PATENT DOCUMENTS

| | | | | |
|---|---|---|---|---|
| 5,659,732 A | * | 8/1997 | Kirsch | 1/1 |
| 5,987,446 A | * | 11/1999 | Corey et al. | 1/1 |
| 6,526,440 B1 | * | 2/2003 | Bharat | 709/219 |
| 7,058,628 B1 | * | 6/2006 | Page | 1/1 |
| 8,055,669 B1 | * | 11/2011 | Singhal et al. | 707/765 |
| 8,145,617 B1 | * | 3/2012 | Verstak et al. | 707/708 |
| 8,234,273 B2 | * | 7/2012 | Acharya et al. | 707/725 |
| 8,249,014 B2 | * | 8/2012 | Stanwood et al. | 370/329 |
| 8,522,129 B1 | * | 8/2013 | Verstak et al. | 715/229 |
| 2003/0055831 A1 | * | 3/2003 | Ryan et al. | 707/100 |
| 2006/0023945 A1 | * | 2/2006 | King et al. | 382/173 |

(Continued)

FOREIGN PATENT DOCUMENTS

| | | | |
|---|---|---|---|
| WO | WO 03/098477 | * | 11/2003 |
| WO | WO2004023243 | * | 3/2004 |
| WO | WO2008157022 | * | 12/2008 |
| WO | WO 2009070287 | * | 6/2009 |

OTHER PUBLICATIONS

Bo Geng et a., "Content-Aware Ranking for Visual Search", Computer Vision and Pattern Recognition (CVPR), 2010 IEEE Conference, 2010, pp. 3400-3407.*

(Continued)

*Primary Examiner* — Srirama Channavajjala
(74) *Attorney, Agent, or Firm* — Fish & Richardson P.C.

(57) ABSTRACT

Methods, systems, and apparatus, including computer programs encoded on a computer storage medium, for query modification. In one aspect, a method includes receiving an original query including a first limitation. First search results responsive to a modified query are obtained, where the first limitation has been omitted from the modified query. One or more common characteristics shared by two or more resources are identified. Each of the two or more resources corresponds to a different highly-ranked result of the first search results. A second modified query including the original query and a second limitation representing the one or more common characteristics is generated. Second search results responsive to the second modified query are obtained. The second search results are provided in a response to the original query.

27 Claims, 8 Drawing Sheets

(56) References Cited

U.S. PATENT DOCUMENTS

2006/0064411 A1* 3/2006 Gross et al. .................. 707/3
2006/0155751 A1* 7/2006 Geshwind et al. ............ 707/102
2006/0206474 A1* 9/2006 Kapur et al. .................. 707/5
2008/0091670 A1* 4/2008 Ismalon ........................ 707/5
2008/0313147 A1* 12/2008 Svore et al. .................. 707/3
2010/0082582 A1* 4/2010 Gao et al. ..................... 707/706
2011/0119260 A1* 5/2011 Hu et al. ...................... 707/723
2011/0258212 A1* 10/2011 Lu et al. ...................... 707/760

OTHER PUBLICATIONS

Jiang et al., "Query suggestion by query search: a new approach to user support in web search," IEEE Computer Society, 2009, 679-684.

* cited by examiner

| Characteristic | Score | Threshold | Satisfies Threshold? | Corresponding Query Limitation |
|---|---|---|---|---|
| Query terms occur in a phrase  130a | 0.7  202a | ≥ 0.6  204a | Yes  206a | " "  208a |
| Query terms occur in title  130b | 1.0  202b | ≥ 0.6  204b | Yes  206b | intitle:  208b |
| Query terms occur in abstract  130c | 0.3  202c | ≥ 0.7  204c | No  206c | inabstract:  208c |
| Publication date (since 2005)  130d | 0.3  202d | ≥ 0.9  204d | No  206d | dateafter: 2005  208d |
| Number of citations (greater than 10)  130e | 0.7  202e | ≥ 0.9  204e | No  206e | citations ≥ 10  208e |

QUERY MODIFICATION

CROSS-REFERENCE TO RELATED APPLICATIONS

This application claims the benefit under 35 U.S.C. §119(e) of the filing date of U.S. Provisional Application No. 61/482,016, titled "QUERY MODIFICATION," which was filed on May 3, 2011, and which is incorporated herein by reference.

BACKGROUND

The present specification relates to information retrieval.

Internet search engines aim to identify resources (e.g., web pages, images, text documents, multimedia content) that are relevant to a user's needs and to present information about the resources in a manner that is most useful to the user. Users typically submit queries that indicate the information the users desire to retrieve. In response to the user-submitted queries, conventional search engines provide search results responsive to the queries.

SUMMARY

When a query is received, search results that are responsive to the query or responsive to a variation of the query are used to generate a modified query. The search results are used to identify characteristics of high-quality search results. For example, common characteristics shared by resources corresponding to highly-ranked search results can be identified. The modified query is generated to include the limitations of the original query and an additional limitation representing one or more of the identified characteristics.

In general, an innovative aspect of the subject matter described in this specification may be embodied in methods that include the actions of receiving an original query including a first limitation; obtaining first search results responsive to a modified query in which the first limitation has been omitted; identifying one or more common characteristics shared by two or more resources, each of the two or more resources corresponding to a different highly-ranked result of the first search results; generating a second modified query including the original query and a second limitation representing the one or more common characteristics; obtaining second search results responsive to the second modified query; and providing the second search results in a response to the original query.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. The first limitation requires a search engine performing a search based on the original query to identify results that each reference a corresponding resource of a particular document type or a resource from a particular document collection. The second limitation requires the second search results to each reference a corresponding resource having the one or more common characteristics. Generating a second modified query includes generating scores for each of the one or more common characteristics based on a count of results of the plurality of highly-ranked results that reference a corresponding resource having the one or more common characteristics and determining that one or more of the scores satisfy a threshold. The first limitation constrains a time, a date, a document type, a media type, a language, an author, a publisher, a number of links or citations, or a geographical region of resources corresponding to results responsive to the original query. Generating a second modified query includes selecting the second limitation based on a property of the first limitation. Generating a second modified query includes automatically generating the second modified query, without receiving a request to add the second limitation. The one or more characteristics include a plurality of characteristics, generating a second modified query includes generating the second modified query including the original query, the second limitation, and a third limitation, the second limitation and the third limitation representing different characteristics of the plurality of characteristics. The method further includes identifying one or more common characteristics shared by two or more highly-ranked results of the first search results, where generating a second modified query including the original query and a second limitation representing the one or more common characteristics includes generating a second modified query including: the original query, a second limitation representing the one or more common characteristics shared by the two or more resources, and a third limitation representing the one or more common characteristics shared by the two or more highly-ranked results.

In general, another innovative aspect of the subject matter described in this specification may be embodied in methods that include the actions of, after providing first search results responsive to an original query, receiving a request to provide results responsive to a narrowed query including the original query and an additional first limitation; identifying one or more characteristics of one or more highly-ranked results of the first search results or of one or more resources corresponding to the one or more highly-ranked results; generating a modified query including the original query, the first limitation, and a second limitation representing the one or more characteristics; obtaining second search results responsive to the modified query; and providing the second search results in a response to the request.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. The first limitation requires a search engine performing a search based on the original query to identify results that each reference a corresponding resource of a particular document type or a resource from a particular document collection. The second limitation requires the second search results to have the one or more characteristics. The one or more highly-ranked results includes a plurality of highly-ranked results of the first search results, identifying one or more characteristics includes identifying one or more common characteristics shared by the plurality of highly-ranked results or shared by resources corresponding to different highly-ranked results of the plurality of highly-ranked results, and the second limitation represents the one or more common characteristics. Generating a modified query includes: generating scores for each of the one or more common characteristics based on a count of results of the plurality of highly-ranked results that have the one or more common characteristics or a count of resources corresponding to results of the plurality of highly-ranked results that have the one or more common characteristics; and determining that one or more of the scores satisfy a threshold. The first limitation constrains a time, a date, a document type, a media type, a language, an author, a publisher, a number of links or citations, or a geographical region of resources corresponding to results responsive to the original query. Generating a modified query includes selecting the second limitation based on a property of the first limitation. The one or more characteristics include a plurality of characteristics, and generating a modified query includes generating the second modified query including the original query, the first limitation, the second limitation, and a third limitation, the second limitation and the third limitation representing different characteristics of the plurality of characteristics.

In general, another innovative aspect of the subject matter described in this specification may be embodied in methods that include the actions of receiving an original query; obtaining search results responsive to the original query; identifying one or more common characteristics shared by two or more resources, each of the two or more resources corresponding to a different highly-ranked result of the search results; selecting a first limitation not included in the original query; generating a suggested query including the original query, the first limitation, and a second limitation representing the one or more common characteristics; and providing the search results and information indicating the suggested query in a response to the original query.

Other embodiments of this aspect include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. The first limitation is a non-keyword limitation that is not expressed in a keyword string of the suggested query. The first limitation requires a search engine performing a search based on the original query to identify results that each reference a corresponding resource of a particular document type or a resource from a particular document collection. The second limitation requires results to the suggested query to each reference a corresponding resource having the one or more common characteristics. Generating the suggested query further includes: generating scores for each of the one or more common characteristics based on a count of results of the plurality of highly-ranked results that reference a corresponding resource having the one or more common characteristics; and determining that one or more of the scores satisfy a threshold. The one or more common characteristics include a first common characteristic, and a second common characteristic; selecting a first limitation includes selecting a first limitation that represents the first common characteristic; and the second limitation represents the second common characteristic. Selecting a first limitation not included in the original query includes: generating a score based on a count of the two or more resources have the first common characteristic and the second characteristic; determining that the score satisfies a threshold; and selecting a first limitation that represents the first common characteristic occurs in response to determining that the score satisfies the threshold. The first limitation constrains a time, a date, a document type, a media type, a language, an author, a publisher, a number of links or citations, or a geographical region of resources corresponding to results responsive to the original query.

As used by this specification, a search query includes one or more query terms that a user submits to a search engine when the user requests the search engine to execute a search, where a term or a query term includes one or more whole or partial words, characters, or strings of characters. Among other things, a result (or a search result) of the search query includes a Uniform Resource Identifier (URI) that references a resource that the search engine determines to be responsive to the search query. The search result may include other things, for example, a title, preview image, user rating, map or directions, description of the corresponding resource, or a snippet of text that has been automatically or manually extracted from, or otherwise associated with, the corresponding resource.

Particular embodiments of the subject matter described in this specification can be implemented so as to realize one or more of the following advantages. Results identified in response to a query can be results that are likely to be relevant to a user, even when the query is imprecise. Results provided in response to queries that further limit a previously received query can have consistent characteristics.

The details of one or more embodiments are set forth in the accompanying drawings and the description below. Other features and advantages will become apparent from the description, the drawings, and the claims.

BRIEF DESCRIPTION OF THE DRAWINGS

FIG. 2 is a table illustrating an example of analysis to select query limitations.

Like reference numbers and designations in the various drawings indicate like elements.

DETAILED DESCRIPTION

Figure 1:
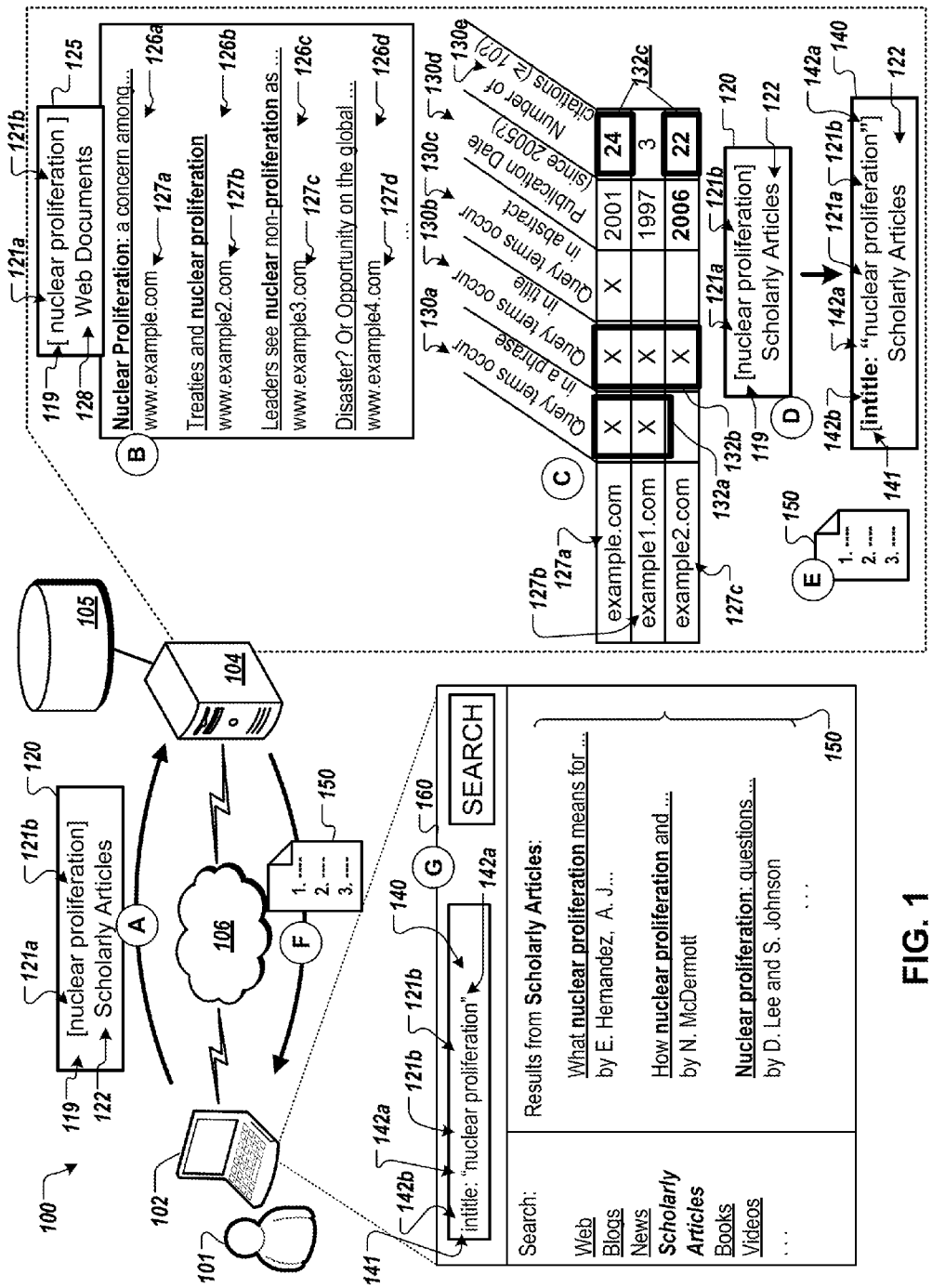
FIG. 1 is a diagram of an example system that can perform query modification.

FIG. 1 is a diagram of an example system 100 that can perform query modification. The system 100 includes a client device 102, a server system 104, one or more data storage devices 105, and a network 106. The client device 102 can be, for example, a desktop computer, laptop computer, cellular phone, smart phone, tablet computer, or navigation system. The functions performed by the server system 104 can be performed by individual computer systems or can be distributed across multiple computer systems. The network 106 can be wired or wireless or a combination of both and can include the Internet. The diagram shows states (A) to (G), which may occur in the sequence illustrated or in a different sequence. States (A) to (F) illustrate a flow of data, and state (G) illustrates a user interface 160.

During state (A), a user 101 of the client device 102 initiates a search using a keyword string 119 that includes one or more query terms 121a, 121b. The context in which the keyword string 119 is received may also indicate limitations that constrain the search. The client device 102 transmits a query 120 including the keyword string 119 and information indicating limitations for the search from the context in which the keyword string 119 was received. The query 120 that is received by the server system 104 includes more than the keyword string 119 entered by the user 101.

The query 120 may specify limitations from context, or may provide information about the context that permits the server system 104 to identify appropriate limitations from the context. Context for the keyword string 119 can include, for example, a Uniform Resource Locator (URL) and content of a rendered resource having a user interface with which the keyword string 119 was received. Context can include values or states of controls on a user interface in which the keyword string 119 was received and the identity or location of a control in which the keyword string 119 was received. Limitations of a query 120 from context may or may not be indicated to the user 101 on a user interface.

Limitations of the query 120, whether expressed in the keyword string 119 or not, can be keyword or non-keyword query components. The query 120 includes at least one keyword limitation, e.g., the query terms 121a, 121b, and at least one non-keyword limitation 122.

Keyword limitations define the terms and patterns of terms to be matched against, for example, documents and metadata. Examples of keyword limitations include query terms and operators defining patterns of query terms, e.g., Boolean logic.

Non-keyword limitations include other restrictions on a search. For example, non-keyword limitations can restrict locations in which keyword patterns are found or restrict values associated with a resource. Non-keyword limitations can require a search engine to identify results based on information about a document, for example, a document type, a document collection in which a document is included, a geographical location, a language, or a time or date range.

Information about a document may be indicated in fields of an index describing a document, and non-keyword limitations may restrict the values of one or more fields. Non-keyword limitations may restrict a value indicating, for example, a document type, a date of publication, a date of addition to a collection, an author, or a publisher. A non-keyword limitation may also indicate whether a resource links to or cites to a particular resource or whether a resource is similar to a particular resource.

Non-keyword limitations can require a search engine to identify results using an index focused on news, web pages, books, or scholarly articles, thus requiring the identified results to reference documents in a particular corpus of documents. Non-keyword limitations can thus have the effect of narrowing a source set of documents or source set of data from which responsive results are identified.

Keyword and non-keyword limitations can be expressed in a keyword string, in context for a keyword string, or both. For example, a keyword string can include a label, such as "dateafter:", that can indicate a date restriction on a publication date, which is a non-keyword limitation. The same limitation may alternatively or additionally indicated on a control a user interface.

In the illustrated example, the contents of the keyword string 119 is denoted by brackets, for example, "[nuclear proliferation]", indicating that the query 120 includes the term 121a "nuclear" and the term 121b "proliferation".

Also in the example, the query 120 also includes a non-keyword limitation 122 that constrains a search engine to provide results that reference corresponding resources that are scholarly articles. Results that are responsive to the query 120 do not correspond to other types of documents, such as web pages and books.

The limitation 122 in the example is indicated in context for the keyword string 119 rather than in the keyword string 119 itself. For example, the limitation 122 can be included due to user 101 entering the keyword string 119 on a user interface (not shown) of a web page for searching for scholarly articles. The one or more non-keyword limitations 122 of the query 120 may alternatively be expressed in a keyword string.

In some implementations, the server system 104 performs the actions described for states (B) through (F), described below, in response to each query received by the server system 104.

During state (B), the server system 104 obtains first search results 126a-126d responsive to a modified query 125. The modified query 125 is a variation of the original query 120 that omits one or more non-keyword limitations of the original query 120. As a result, the modified query 125 broadens the original query 120 in at least one aspect. In the example, the server system 104 generates the modified query 125, which omits the limitation 122 requiring results to be scholarly articles. Consequently, the identified results 126a-126d reference resources from the web, a broader collection of which scholarly articles are a subset.

Each search result 126a-126d references at least one corresponding resource 127a-127d. Although the reference characters for the resources 127a-127d in the illustration are shown in association with URLs, description of the resources 127a-127d refers to the resources accessible at the URLs and not to the URLs themselves. For example, the result 126a corresponds to the resource 127a accessible at the URL "www.example.com". To obtain the first search results 126a-126d, the server system 104 may cause a search to be performed using the modified query 125, but need not do so.

In some implementations, the modified query 125 includes the keyword limitations of the original query 120. Thus, the resources 127a-127d referenced by the search results 126a-126d are responsive to the patterns of query terms 121a, 121b indicated by the original query 120. Nevertheless, some of the resources 127a-127d referenced by the results 126a-126d may not satisfy the omitted non-keyword limitations 122 of the original query 120, for example, because the resources 127a-127d have a document type excluded by the limitation 122.

During state (C), the server system 104 identifies one or more characteristics of one or more of the resources 127a-127d referenced by the results 126a-126d. In particular, the server system 104 identifies characteristics of resources corresponding to highly-ranked results responsive to the modified query 125.

In this example, the server system 104 uses the resources referenced by highly-ranked results as examples of useful, high-quality resources. The server system 104 can extract information implicit in the ranking of the results 126a-126d by inferring that characteristics of the resources corresponding to the highly-ranked results are characteristics of useful, high-quality resources.

The highly-ranked results can be selected as, for example, the N-highest-ranking results, where N is an integer. The value for N can be a predetermined number. In the example, the highly-ranked results are selected as the top three results: results 126a-126c of the results 126a-126d.

The server system 104 can identify various characteristics 130a-130e of the resources 127a-127c corresponding to the highly-ranked results 126a-126c. For example, the server system 104 can identify characteristics of the resources 127a-127c that are related to the query terms 121a, 121b. Characteristics of a particular resource of the resources 127a-127c include, for example, whether one or more of the query terms 121a, 121b occur in the particular resource 127a-127c: (i) in a particular portion or field, e.g., the title, abstract, body, or metadata; (ii) in a particular sequence or as a phrase; (iii) at a particular distance from each other; or (iv) with a particular frequency. Characteristics of a particular resource of the resources 127a-127c can also include whether query terms occur in one or more resources that cite to or include a link to the particular resource of the resources 127a-127c, including whether query terms 121a, 121b occur in anchor text of a link to the particular resource of the resources 127a-127c.

The server system 104 can also identify other characteristics of the resources 127a-127c corresponding to highly-ranked results 126a-126c including, for example, a document length, a language, a time or date of publication, a number of citations or links to the respective resources 127a-127c, a link analysis score, a media type of each resource of the resources 127a-127c, a classification or document type of the resources 127a-127c (e.g., whether each of the resources 127a-127c is a book, an article, a blog, or a web page), or a topic of the content of the resources 127a-127c. Identified characteristics can also include the occurrence of one or more terms other than the query terms 121a, 121b in the highly-ranked results 126a-126c.

Characteristics can also include a geographical location associated with one or more of the resources 127a-127c. A geographical location can be associated with a resource due to, for example, an occurrence of an address or other geographically identifying information in one or more of the resources 127a-127c, or a top-level domain name that indicates the source of one or more of the respective resources 127a-127c.

The server system 104 can also identify common characteristics shared by resources 127a-127c corresponding to different highly-ranking results 126a-126c. For example, the server system 104 can determine whether at least two resources of the resources 127a-127c have a particular characteristic. For example, as a first common characteristic 132a, the server system 104 determines that two resources 127a-127c include the query terms 121a, 121b in a phrase, in other words, adjacent to each other in the sequence that the query terms. As a second common characteristic 132b, the server system 104 determines that all three resources 127a-127c include the query terms 121a, 121b in a title field. As a third common characteristic 132b, the server system 104 determines that two resources of the resources 127a-127c are cited to by more than ten other resources.

The server system 104 can also identify combinations of characteristics that occur together. The server system 104 can determine whether two or more of the resources 127a-127c corresponding to highly-ranked results 126a-126c have a particular combination of identified characteristics 130a-130e. For example, the server system 104 can determine that for two of the highly-ranked results 126a-126c, the query terms 121a, 121b occur as a phrase and also occur in the title, or more particularly, they occur as a phrase in the title.

In some implementations, in addition to or as an alternative to comparing identified characteristics 130a-130e of the resources 127a-127c to identify common characteristics, the server system 104 compares the content of the of the highly-ranked results 126a-126c to determine commonalties. The server system 104 can determine that two or more of the resources 127a-127c referenced by highly-ranked results 126a-126c include a particular image, or include particular terms other than the query terms 121a, 121b.

In some implementations, the server system 104 identifies characteristics of the highly-ranked results 126a-126c in addition to, or instead of, identifying characteristics of the resources 127a-127c corresponding to the highly-ranked results 126a-126c. The server system 104 can identify common characteristics among the highly ranked results 126a-126c, including common characteristics of aspects of the results 126a-126c that would be visibly displayed to a user when the results 126a-126c are presented on a user interface. For example, common features of the titles and text snippets of the highly-ranked results 126a-126c can be identified. Thus the characteristics 130a-130e and the common characteristics 132a-132c can include characteristics and common characteristics of the highly-ranked results 126a-126c.

During state (D), the server system 104 generates a second modified query 140. The second modified query 140 includes the constraints of the original query 120. In addition, the second modified query 140 includes one or more additional limitations 142a, 142b selected based on the identified characteristics 130a-130e of the resources 127a-127c corresponding to the highly-ranked results 126a-126c to the first modified query 125.

The additional limitations 142a, 142b each represent one or more of the identified characteristics 130a-130e. For example, the additional limitations 142a, 142b can require results that are responsive to the second modified query 140 to have one or more of the identified characteristics 130a-130e. In some implementations, the additional limitations 142a, 142b are selected to represent the common characteristics 132a, 132b determined to be shared by multiple of the highly-ranked results 126a-126c.

FIG. 2 is a table 200 illustrating an example of analysis to select query limitations. To select the additional limitations 142a, 142b, the server system 104 can generate respective scores 202a-202e for each identified characteristic 130a-130e and determine whether the scores 202a-202e satisfy one or more corresponding thresholds 204a-204e. Additional limitations 142a, 142b for the second modified query 140 can be selected to represent one or more characteristics 130a-130e having respective scores 202a-202e that satisfy a corresponding threshold 204a-204e. The thresholds 204a-204e can represent a level of commonality necessary for a corresponding characteristic 130a-130e to be indicative of high quality.

In some implementations, the scores 202a-202e for each identified characteristic 130a-130e are determined based on a count of how many of the resources 127a-127c corresponding to highly-ranked results 126a-126c have the respective characteristics 130a-130e. A score 202a-202e can be a fraction representing the count divided by the total number of highly-ranked results 126a-126c.

In some other implementations, the scores 202a-202e are based on a position-weighted sum, where weighting values are determined based on the ranking of each of the highly-ranked results 126a-126c. Occurrence of a characteristic 130a-130e in the first-ranked result 126a can correspond to a weighting value $W_1$, occurrence of a characteristic 130a-130e in the second-ranked result 126b can correspond to a weighting value of $W_2$, and so on. Higher-ranked positions can have higher weighting values, resulting in higher influence in the weighted sum. For a particular characteristic 130a-130e, the score 202a-202e can be the sum of the weighting values for results 126a-126c in which the characteristic 130a-130e occurs.

In some implementations, for identified characteristics of the highly-ranked results 126a-126c, rather than characteristics of resources 127a-127c corresponding to the highly-ranked results 126a-126c, the scores are determined based on occurrence of the characteristic in the results 126a-126c.

For example, with respect to the characteristic 130a, the server system 104 determines that two of the three, or approximately 70%, of the highly-ranked results 126a-126c reference a resource 127a-127c that includes the query terms 121a, 121b in a phrase. Based on this percentage, the server system 104 generates a score 202a of "0.7". Alternatively, the server system 104 can assign a score of "2" to indicate that two of the resources 127a-127c have the characteristic 130a, or can calculate a weighed sum as described above.

The server system 104 compares the score 202a to the corresponding threshold 204a, determining that the score 202a satisfies the threshold 204a because it exceeds the threshold value of "0.6". As a result of this determination 206a, as discussed further below, the server system 104 may include a limitation 208a representing the characteristic 130a in the second modified query 140. However, as described below, not every characteristic having a score above the corresponding threshold is necessarily represented by an additional limitation. The scores 202b-202e for the other characteristics 130b-130e can be generated and compared to corresponding thresholds 204b-204e in a similar manner as described for the characteristic 130a.

For each characteristic 130a-130e, a corresponding query limitation 208a-208e can require results identified by a search engine to reference a corresponding resource having the characteristic 130a-130e or a similar characteristic. For example, for the characteristic 130a, the corresponding limitation 208a is a phrase operator, which requires query terms within the quotation marks to occur as a phrase. When included in the second modified query 140, the limitation 208a requires query terms 121a, 121b to occur as a phrase. Similarly, the limitation 208b constrains query terms 121a, 121b to occur in a title field, thus requiring results to reference corresponding resources that have the characteristic 130b.

In some implementations, multiple candidate query limitations correspond to a particular characteristic 130a-130e. Based on properties of the limitations, the server system 104 can select a limitation to represent an identified characteristic that is most appropriate in combination with the limitations of the original query 120. The query limitation representing a characteristic may be selected based on one or more limitations of the original query 120, and in particular, may be based on one of the non-keyword limitations 122.

The server system 104 can select a limitation corresponding to a characteristic based on one or more properties of the first limitation 122, which was omitted in the first modified query 125. As an example, one property of a first limitation may be that the first limitation limits results to correspond to books, or to correspond to a resource of a different document type that does not include an abstract field. The server system 104 may identify as a common characteristic that query terms are included in the abstract of resources referenced by different highly-ranked results. A limitation that constrains query terms to occur in the abstract would, combined with the first limitation, results in an empty result set for the second modified query. Rather than constraining query terms to occur in the abstract, based on properties of the first limitation, the server system 104 can select a different limitation, such as a limitation that terms to occur in the first chapter of each responsive result or to occur in the first 25 pages of each responsive result.

The query limitations 208a-208e can be keyword or non-keyword limitations. Some query limitations 208a-208e, if included in the second modified query 140 may be expressed in a keyword string 141 of the second modified query 140. Other query limitations 208a-208e may not be expressed in the keyword string 141 and may not be indicated to the user 101 at all. For example, the limitation 208e requires a search engine to identify results corresponding to resources that are cited to by 10 or more other documents. When included in the second modified query 140, the limitation 208e may not be indicated to the user 101. Similarly, the limitation 208e may be one that is not selectable by the user 101 in composing the original query 120.

The server system 104 selects one or more of the limitations 208a-208e to add to the second modified query 140, based on whether the scores 202a-202e for the characteristics 130a-130e satisfy the corresponding thresholds 204a-204e. For example, the determinations 206a-206e indicate that the characteristics 130a, 130b have scores satisfying the corresponding thresholds 204a, 204b. As a result, the limitations 208a, 208b representing those characteristics 130a, 130b are candidate limitations for addition to the query 140.

In some implementations, to avoid over-constraining the query 140, the number of additional limitations that are included in the query 140 is limited to a maximum number, e.g., a maximum of three additional limitations. If there are three or fewer candidate limitations, all of the candidate limitations can be included in the query 140. In the example, both of the candidate limitations, the limitations 208a, 208b corresponding to the characteristics 130a, 130b, are selected and included in the second modified query 140 as the limitations 142a, 142b.

If there are more candidate limitations than the maximum number that can be included, the server system 104 selects a subset of the candidate limitations to include in the query 140. In some implementations, the server system 104 selects limitations according to a specified order. In some implementations, the server system 104 selects the candidate limitations corresponding to the most commonly occurring of the characteristics 130a-130e. For each characteristic, the server system 104 can count the resources 127a-127c that have the characteristic. By comparing the counts, the server system 104 can identify the most common characteristics, and can select the limitations corresponding to the most common characteristics to add to the query 140.

In some implementations, the server system 104 generates scores based on a count of resources in which combinations of characteristics occur together, and compares the scores to thresholds. Combinations of limitations are selected when the score for the combination satisfies a threshold. For example, the limitations 142a, 142b can be selected when a count of the resources 127a-127c including both characteristics 130a, 130b satisfies a threshold. Similarly, because the limitations 142a, 142b affect each other when combined in a query, the count can be a count of resources 127a-127c in which the query terms 121a, 121b occur as a phrase in a title.

If none of the characteristics 130a-130e have scores that satisfy a corresponding threshold 204a-204e, then the server system 104 would not add an additional limitation to the limitations of the original query 120. In other words, the second modified query 140 would be identical to the original query 120. In this case, the server system 104 can cause a search engine to perform a search based on the original query 120 and provide identified results in response to the original query 120.

Referring again to FIG. 1, during state (E), the server system 104 obtains results 150 to the second modified query 140. For example, the server system 104 can cause a search engine to perform a search to identify the responsive results 150.

During state (F), the server system 104 provides the results 150 to the second modified query 140 to the client device 102.

During state (G), the client device 102 displays the results 150 on a user interface 160. The second modified query 140 includes the limitations of the original query 120, so the results 150 are scholarly articles, as required by the limitation 122. The second modified query 140 includes the additional limitations 142*a*, 142*b* and is thus narrower than the original query 140.

In many instances, the highest-ranking results 150 are likely to be more useful to the user 101 than highest-ranked results that are responsive to the original query 120 would be without the additional limitations 142*a*, 142*b*. Due to the imprecision of the original query 120, results that are responsive to the original query 120 would likely include, in addition to the results 150, many results of lower quality than the results 150.

By contrast, the results 150 to the second modified query 140 are required to reference resources having characteristics 130*a*, 130*b* similar to those of resources referenced by high-quality results. Results that would be responsive to the original query 120 but would not reference resources having the characteristics 130*a*, 130*b* are omitted. Often, the additional limitations 142*a*, 142*b* cause the highest-ranking of the results 150 to the second modified query 140 to be of higher quality than the highest-ranking results to the broader but imprecise original query 120.

As an example, if historical query data for searches of scholarly articles is very limited, ranking the results 150 based on such data may not be effective. By contrast, extensive historical query data may be available for searches of the web, resulting in the results 126*a*-126*d* to the modified query 125 being very well-ranked. Without access to any of the information or methodology used to rank the web results 126*a*-126*d*, the characteristics 130*a*, 130*b* correlated with high rankings are identified and imitated in the results 150 to the second modified query 140. The second modified query 140 requires the results 150 to reference resources having the characteristics 130*a*, 130*b*, which can improve the quality of the results 150 provided to the user 101.

In some implementations, second modified query 140 is displayed on the user interface 160, indicating that the original query 120 was modified. In some other implementations, no indication that the original query 120 was modified is displayed. For example, when a pattern of characteristics is very strong among the highly-ranked results 126*a*-126*c*, the server system 104 may determine that there is a high confidence level that the additional limitations 142*a*, 142*c* will produce results 150 that are of high quality. As another example, screen area may be limited on mobile devices. Rather than indicate modifications to the original query 120, available area on a user interface 160 of a mobile device can be used to display results 150 or other information.

In some implementations, the server system 104 does not receive any request to modify the original query 120 or receive any indication from the user 101 that the original query 120 should be modified or further limited. Rather, the server system 104 automatically modifies the original query 120 by generating the second modified query 140. In some implementations, the results 150, which are identified by a search engine performing a search based on the second modified query 140, are presented in place of results identified by performing a search based on the original query 120, when only results identified using the original query 120 were requested.

In some implementations, information about the context of the client device 102 is used to generate the second modified query 140. For example, if the location of the client device 102 is known, the second modified query 140 can include a limitation requiring results to be associated with a geographical area near the client device 102. A result is associated with a geographical area when, for example, the result references a resource that includes a name of a place or includes an address in the area. A result can also be associated with a geographical area when information, including map data or other information extrinsic to a referenced resource, links the referenced resource to an identified location, such as a place of business or source of the resource.

In some implementations, geographical restrictions are included in a second modified query 140 when the location of the client device 102 is known, in addition to other limitations 142*a*, 142*b* representing identified characteristics 130*a*, 130*b*. Alternatively, geographical limitations may be included in the second modified query 140 to represent a characteristic of the highly-ranked results 126*a*-126*c*. For example, the server system 104 can determine whether a threshold number or percentage of the highly ranked results 126*a*-126*c* are associated with the location of the client device 102, and if so, constrain the geographical location of results identified based on the second modified query 140.

Figure 3:
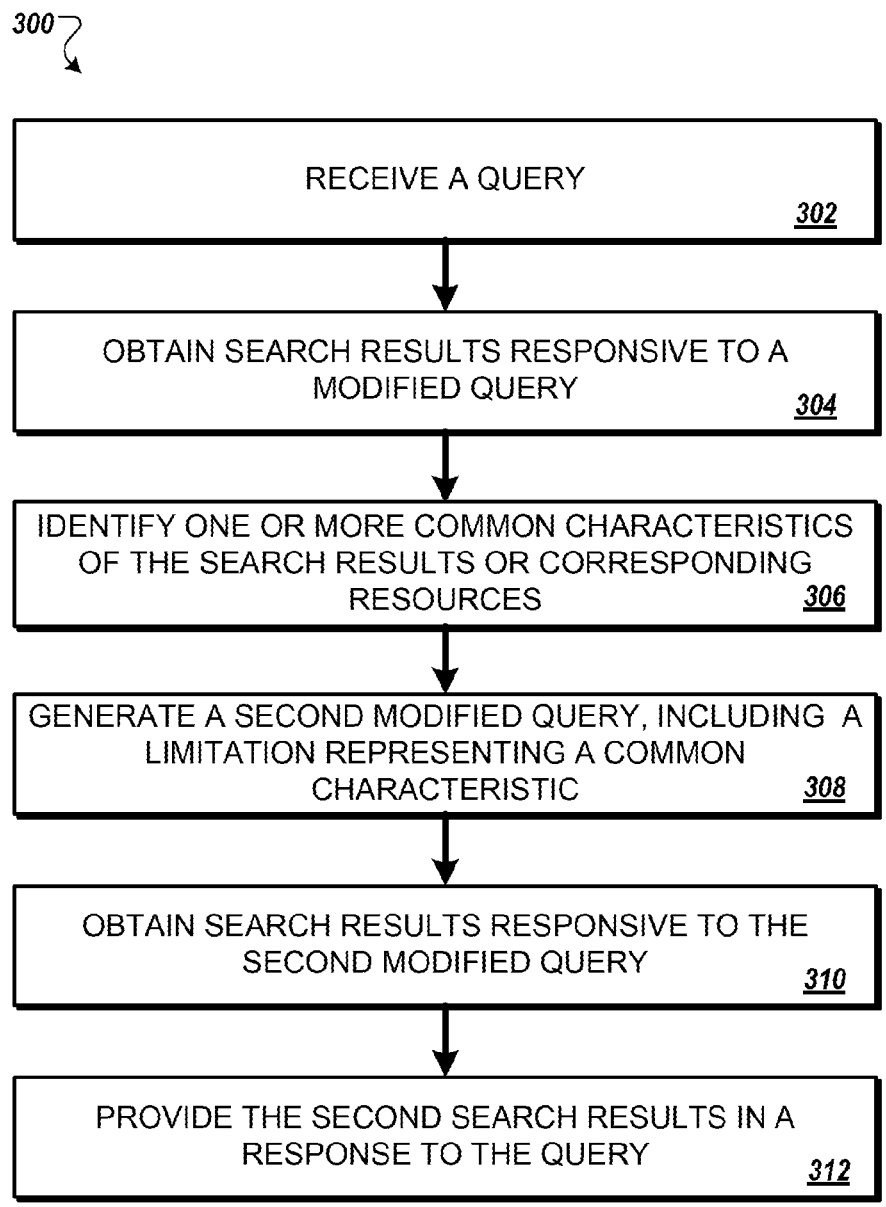
FIG. 3 is a flow chart illustrating an example process for query modification.

FIG. 3 is a flow chart illustrating an example process 300 for query modification.

An original query is received that includes a first limitation (302). For example, the original query can be a query supplied by a user. As described herein, the received query is termed original to denote the query as received, without alteration, and the term original does not indicate the content of the query.

The first limitation can be a non-keyword limitation, for example, one that does not define the query terms or patterns of query terms to be matched in, for example, responsive documents or metadata. The first limitation can further constrain, for example, a time, a date, a media type, a document type, a language, an author, a publisher, a number of links or citations, or a geographical region of resources corresponding to results responsive to the original query. For example, the first limitation can restrict the value of a field associated with a resource that indicates, for example, a document collection or document type of a resource. The first limitation can require a search engine performing a search based on the original query to identify results that each reference a corresponding resource of a particular document type or a resource from a particular document collection.

In some implementations, the first limitation is a limitation determined from context for a keyword string of the original query, and thus the first limitation is not expressed in a keyword string of the original query.

First search results responsive to a modified query are obtained (304). The modified query omits the first limitation of the original query. For example, when the first limitation constrains a query to a range of publication dates, the modified query may instead constrain the query to a broader range of publication dates, or not restrict the publication date altogether.

As another example, the modified query may omit the first limitation and replace it with a limitation of different scope. Still, the modified query is broader in at least one aspect, encompassing one or more potential results that would not be responsive to the original query. For example, when the first limitation requires results to reference resources that are books, the modified query may instead require results to reference resources that are either books or articles, or may require results reference resources that are web pages.

In some implementations query terms and operators on the query terms from the original query are maintained in the modified query. Responsive results can thus include documents that include the patterns of query terms specified in the original query, but otherwise would not be responsive to the original query, for example, because a document type or time range restriction of the first limitation would exclude the documents.

One or more common characteristics shared by two or more resources are identified (306). Each of the two or more resources corresponds to a different highly-ranked result of the first search results. In addition to or as an alternative to identifying common characteristics of resources corresponding to the highly-ranked results, one or more common characteristics shared by two or more of the highly-ranked results can be identified.

Characteristics of one of the highly-ranked results can indicate, for example, the content of the result, the source of the result, a classification of the result, and other information, as described above. Characteristics of a resource can include not only features of the resource, but also aspects of the context in which a resource is accessible or in which the resource was created. For example, characteristics can include a publisher of a resource, a particular internet domain in which the resource is hosted, and a time or date that the resource was published. Characteristics can indicate other information related to a resource, such as a number of other resources that cite to the resource, and the popularity of the resource.

Common characteristics shared by resources referenced by different highly-ranked results can be identified. For example, for each of the highly-ranked results, characteristics of a referenced resource can be identified, and the identified characteristics can be compared to identify commonalties among the identified characteristics. Additionally, or alternatively, the resources referenced by the highly-ranked results can be compared to each other without regard to previously identified characteristics.

A second modified query is generated (308). The second modified query includes the original query and a second limitation representing the one or more common characteristics. A second modified query includes the original query by including each of the limitations of the original query.

By representing the one or more common characteristics, the second limitation can require results identified in a search based on the second modified query to have the one or more common characteristics or similar characteristics. For example, if multiple highly-ranked results each reference a resource that is determined to be cited to by three or more documents, then the second limitation can constrain the modified query such that results identified are to be cited to by three or more documents. The second limitation can be a limitation that is not expressed in a keyword string for the second modified query.

The second modified query can include multiple limitations representing different identified characteristics. For example, the second limitation can represent one or more identified characteristics, and the second modified query can also include a third limitation representing different identified characteristics. In some implementations, generating a second modified query includes selecting the second limitation based on a property or effect of the first limitation.

The second modified query can be automatically generated, without receiving a request to add the second limitation. For example, the second limitation can be added without an indication from a user that the original query should be modified.

Generating the second modified query can include generating scores for each of the one or more identified characteristics. The score for each characteristic can be based on a count of how many of the highly-ranked results reference a resource that has the characteristic. For each characteristic, it can be determined whether the score satisfies a corresponding threshold. If so, a limitation representing the characteristic can be included in the second modified query. The limitation representing the characteristic can constrain a search engine to identify results that have the represented characteristic or a similar characteristic.

Generating a second modified query can include generating a second modified query including the original query, a second limitation representing the one or more common characteristics shared by the two or more resources, and a third limitation representing the one or more common characteristics shared by the two or more highly ranked results.

Second search results responsive to the second modified query are obtained (310). For example, a search engine can perform a search to identify results that reference documents that satisfy the limitations of the second modified query.

The second search results are provided in a response to the original query (312). The second search results can be provided rather than providing results that would be retrieved by evaluating the original query. In some implementations, the second modified query can be provided as a suggested query modification for the original query.

One or more of obtaining first search results responsive to the modified query (304), identifying characteristics of highly-ranked first search results (306), generating a second modified query (308), obtaining second search results responsive to the modified query (310), and providing the second search results (312) can be performed in response to receiving the original query (302).

Figure 4:
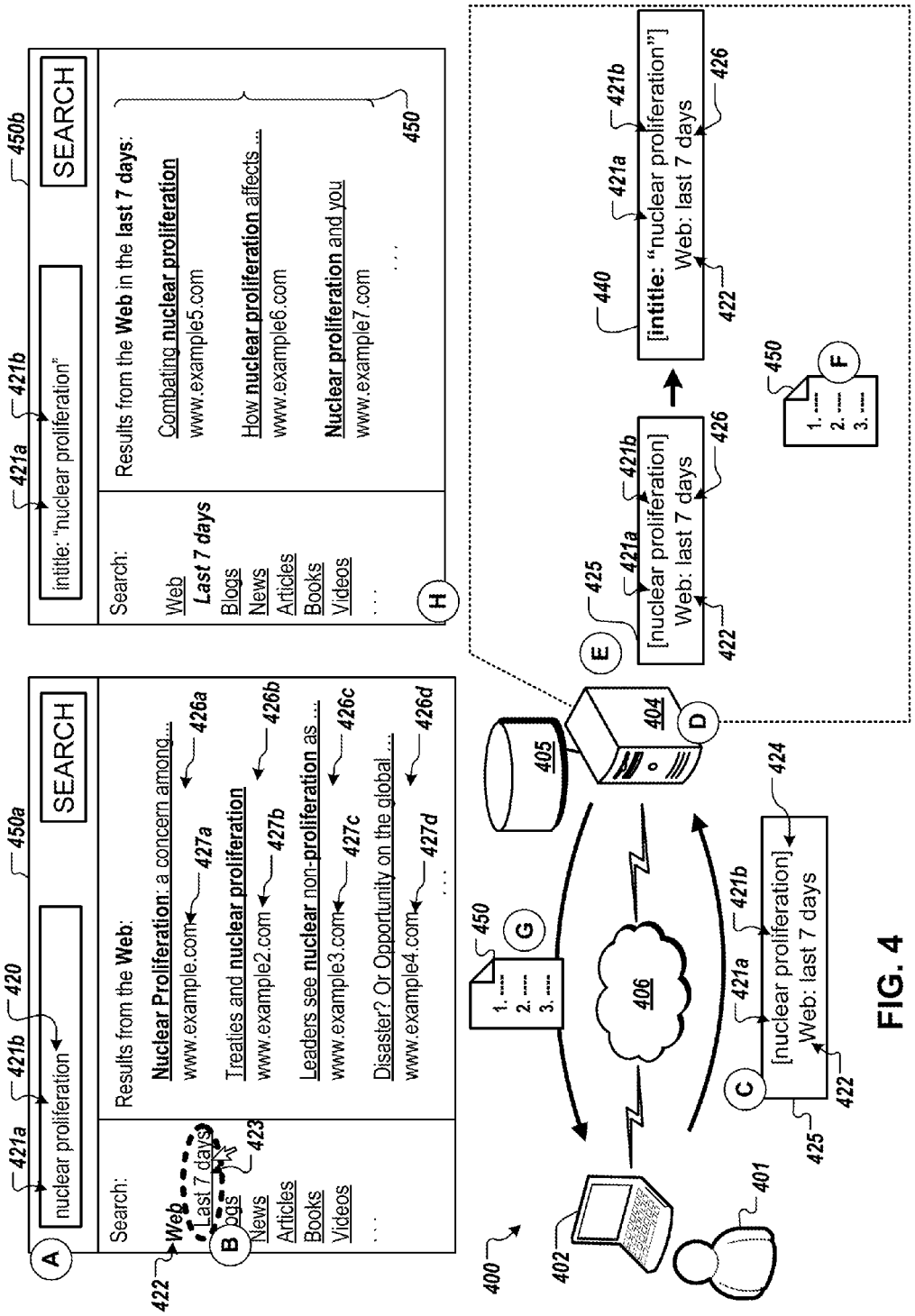
FIG. 4 is a diagram of another example system that can perform query modification.

FIG. 4 is a diagram of another example system 400 that can perform query modification. By contrast with the example in FIG. 1, the system 400 is illustrated performing query modification when a user causes a search to be performed with narrowed query after results to a broader, initial query have been provided.

Similar to the system 100, the system 400 includes a client device 402, a server system 404, one or more data storage devices 405, and a network 406. The diagram shows states (A) to (H), which may occur in the sequence illustrated or in a different sequence. States (B) to (G) illustrate a flow of data, and states (A) and (H) illustrate user interfaces 450a, 450b.

During state (A), the user interface 450a of the client device 402 displays search results 426a-426d responsive to an original query 420. Each search result 426a-426d represents a corresponding resource 427a-427d. For example, the original query 420 can be a query previously submitted by a user 401 of the client device 402. The search results 426a-426c can be results provided by the server system 404 in response to receiving the original query 420. The original query 420 includes one or more query terms 421*a*, 421*b* and includes a non-keyword limitation 422 specifying that search results 426*a*-426*c* must reference resources from the web.

During state (B), the user 401 causes a search to be performed for the original query 420 with one or more additional limitations 424, which can be non-keyword limitations. For example, the additional limitations 424 can further constrain a query component that restricts a date, a document type, or a document collection. In the illustrated example, the user 401 selects a control 423 that limits a date of publication, narrowing the original query 420 so that results identified for the narrowed query reference corresponding resources published to the web in the previous seven days.

During state (C), the server system 404 receives a request 425 from the client device 402 to perform a search using the original query 420 and the additional limitation 424. The request 425 can be a query including all of the limitations of the original query 420 and the additional limitation 424. Thus search results identified by a search engine performing a search based on the request 425 are a subset of the results 426*a*-426*d* responsive to the original query 420.

During state (D), the server system 404 selects highly-ranked results from the results 426*a*-426*d* to the original query 420, in the same manner described above. The server system 404 identifies one or more characteristics of the resources 427*a*-427*d* corresponding to the highly-ranked results. The server system 404 can additionally or alternatively identify characteristics of the highly-ranked results. The server system 404 can identify common characteristics shared by multiple resources corresponding to the highly-ranked results, or shared by multiple highly-ranked results in the same manner described above.

During state (E), the server system 404 generates a modified query 440. The modified query 440 includes the limitations of the query specified by the request 425 and also adds one or more additional limitations 442*a*, 442*b* representing one or more characteristics 430*a*, 430*b* of the highly-ranked results 426*a*-426*c*. In particular, the additional limitations 442*a*, 442*b* can be selected to represent common characteristics 432*a*-432*c* shared by multiple highly-ranked results 426*a*-426*c*.

In the same manner described above with respect to FIG. 2, the server system 404 can generate scores for the characteristics 430*a*-430*c* and compare the scores to corresponding thresholds. The server system 404 can select the one or more additional limitations 442*a*, 442*b* from query limitations representing the characteristics 430*a*-430*c* having scores that satisfy corresponding thresholds.

During state (F), the server system 404 obtains results 450 responsive to the modified query 440. During state (G), the server system 404 provides the results 450 to the client device 402 in a response to the request 425.

During state (H), information identifying the results 450 is presented on the user interface 460*b* of the client device 402. Because the additional limitations 442*a*, 442*b* require the characteristics of the highly-ranked results 426*a*-426*c* or similar characteristics to be present in all of the results 450, the results 450 indicated on the user interface 460*b* are similar to the results 426*a*-426*d* previously indicated on the user interface 460*a*. The results 450 are constrained to reference resources having similar characteristics to, or the same characteristics as, resources referenced by highly-ranked results responsive to the broader original query 420.

Figure 5:
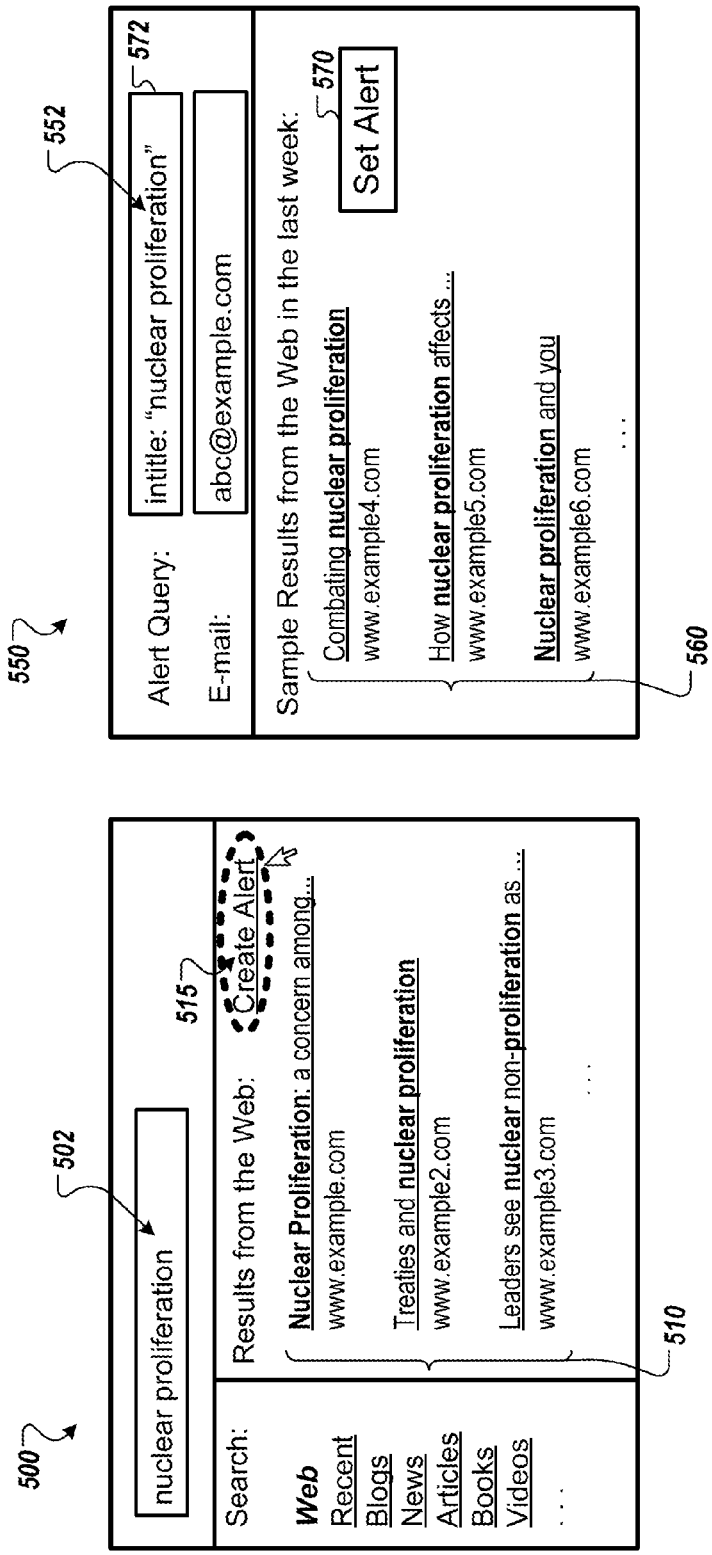
FIGS. 5A and 5B illustrate example user interfaces for query modification.

FIGS. 5A and 5B illustrate example user interfaces 500, 550 for query modification. The user interface 500 displays a search engine results page indicating results 510 responsive to a query 502. The user interface 500 also includes a control 515 permitting a user to create an alert based on the current query 502. For example, a user can select the control 515 to request that a search be periodically performed using the query 502, so that new results since the previous search are transmitted to the user. For example, the alert may be a request to provide newly identified results responsive to the query 502 that have been published or added to a document collection in the previous week. As another example, an alert may specify that results responsive to the query 502 within the current year that were not previously identified should be provided as soon as the new results are identified.

Selection of the control 515 can submit the request for the alert to a server system that, in response, provides information indicated on the user interface 550. The request for an alert based on the original query 502, indicates that the user desires additional results similar to the results 510. Thus the results provided for the alerts should have similar characteristics to the highly-ranked results of the results 510.

To cause those characteristics to be present in alert results, the server system receiving the request can automatically modify the user's query 502, without receiving a request to modify the query or an indication that the user desires the query to be modified. Using the techniques described above, the server system can generate a modified query 552 that includes limitations representing characteristics of the results 510 to the user's query 502.

The modified query 552 can be indicated in the user interface 550. The modified query 552 is a suggested query that improves the precision of the user's original query 502 using the results 510. The user interface 550 indicates sample results 560 to the modified query 552, demonstrating the types of results the user can expect to receive from alert messages. For example, when a weekly alert is requested, the results 560 can be results from the previous week.

The user has the opportunity to review the results 560, and if the results are acceptable, the user can select a control 570 to confirm the alert. If the results 560 are not acceptable, the user may edit the modified query 552 in a text field 572 before causing the alert to be set by selecting the control 570.

Figure 6:
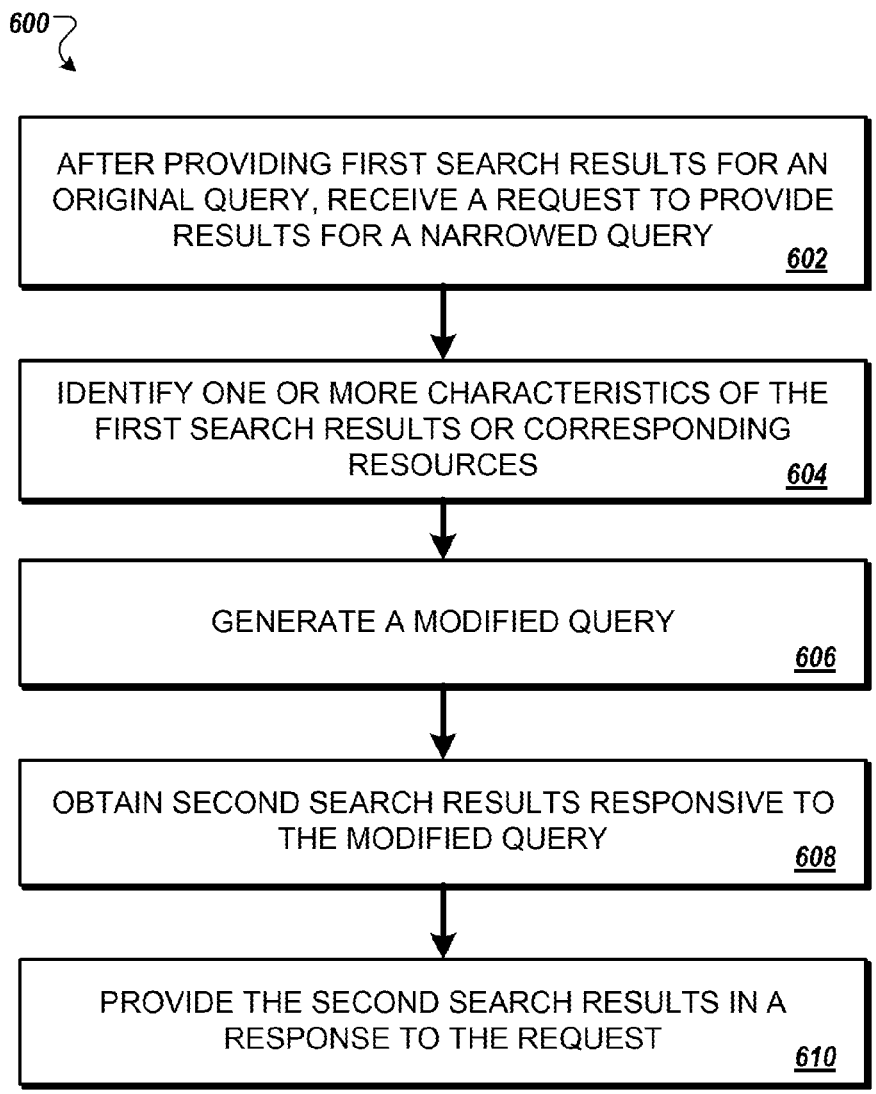
FIG. 6 is a flow chart illustrating another example process for query modification.

FIG. 6 is flow chart illustrating another example process 600 for query modification.

After providing first search results responsive to an original query, a request to provide results responsive to a narrowed query including the original query and an additional first limitation is received (602). The original query and the first limitation can have features as described above with respect to the process 300.

One or more characteristics of one or more highly-ranked results of the first search results or of one or more resources corresponding to the one or more highly-ranked results are identified (604). The highly-ranked results can be selected as described above, and the characteristics can be identified as described above.

A modified query is generated (606). The modified query includes the limitations of the original query, the first limitation, and a second limitation representing the one or more characteristics identified. By representing the one or more identified characteristics, the second limitation can require results responsive to the second modified query to have the one or more identified characteristics or similar characteristics. The modified query can include multiple limitations representing different identified characteristics. For example, the second limitation can represent one or more identified characteristics, and the modified query can also include a third limitation representing one or more different identified characteristics. Generating the modified query can include other features as described above for generating the second modified query in the process 300.

Second search results responsive to the modified query are obtained (608). For example, a search engine can perform a search to identify results that reference resources that satisfy the limitations of the modified query.

The second search results are provided in a response to the request (610). The second search results can be provided instead of results that would be retrieved by performing a search based on the original query and the limitation in the request.

One or more of identifying characteristics of highly-ranked results (604), generating a modified query (606), obtaining second search results responsive to the modified query (608), and providing the second search results (610) can be performed without the received request, or any other request, indicating that the second limitation should be added to the original query and the first limitation. Thus, the second limitation can be added automatically without receiving a request to add the second limitation.

Figure 7:
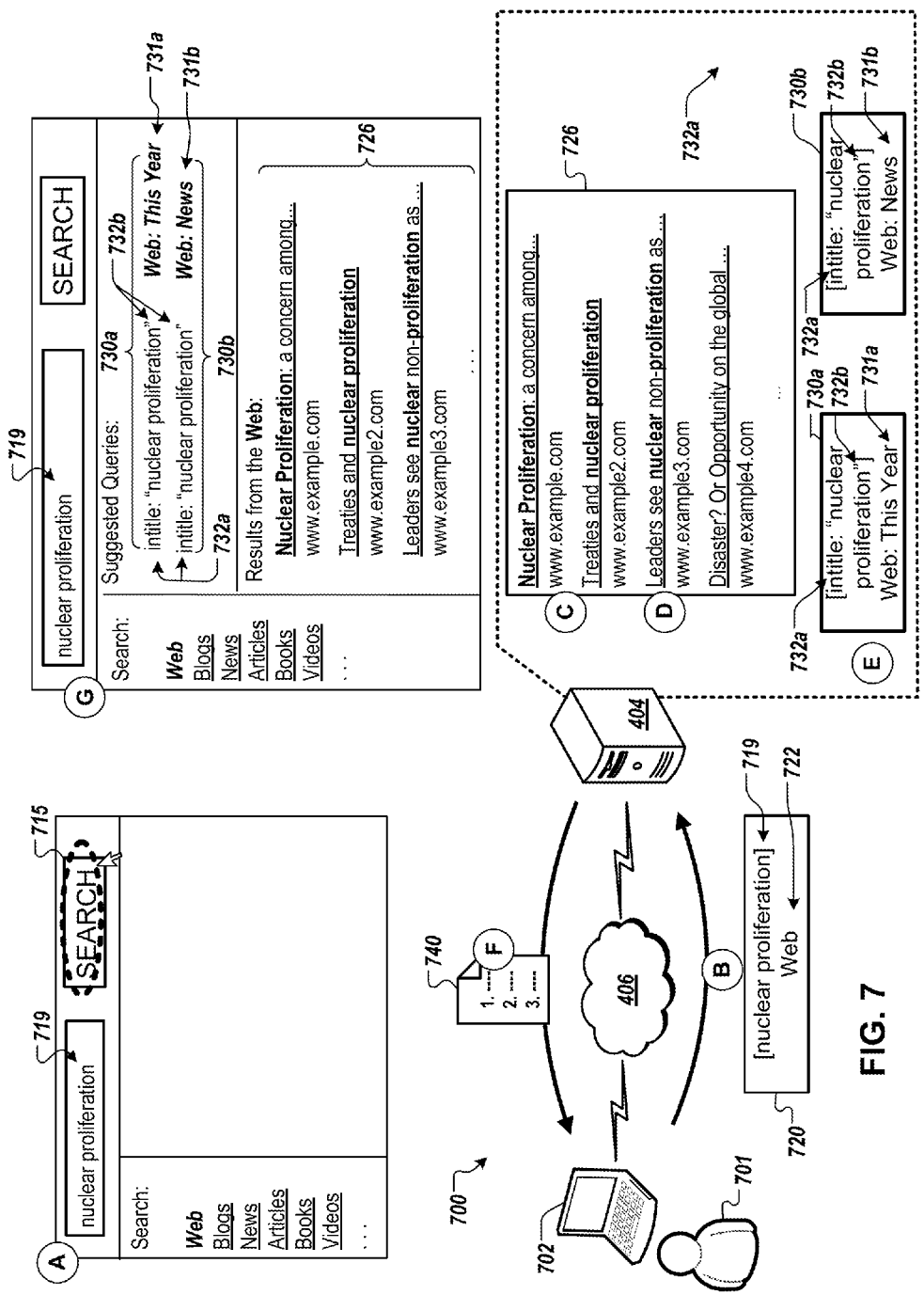
FIG. 7 is a diagram illustrating another example system that can perform query modification.

FIG. 7 is a diagram of another example system 700 that can perform query modification. By contrast with the examples in FIGS. 1 and 4, the system 700 is illustrated as providing query suggestions in a response to a user's initial query.

Similar to the systems 100 and 400, the system 700 includes a client device 702, a server system 704, and a network 706. The diagram shows states (A) to (G), which may occur in the sequence illustrated or in a different sequence. States (B) to (F) illustrate a flow of data, and states (A) and (G) illustrate user interfaces 750a, 750b.

During state (A), a user 701 initiates a search that includes a keyword string 719, for example, by selecting a search control 715 on the user interface 750a. During state (B), the client device 102 transmits a query 720 including the keyword string 719 and a non-keyword limitation to the server system 704. During state (C), the server system 704 obtains search results 726 identified by a search engine in response to the query 720.

During state (D), the server system 704 identifies characteristics of resources corresponding to highly-ranked results of the search results 726, including common characteristics of the resources. Additionally, or alternatively, the server system 704 identifies characteristics of the highly-ranked results, including common characteristics of the highly-ranked results. As described above with respect to FIG. 2, the server system 704 can generate scores for identified common characteristics and determine whether the scores satisfy one or more thresholds.

During state (E), the server system 704 generates one or more suggested queries 730a, 730b. Each suggested query 730a, 730b includes an additional first limitation 731a, 731b that is a non-keyword limitation. The respective first limitations 731a, 731b may represent an identified common characteristic, but need do so. The addition of each first limitation 731a, 731b limits results responsive to the suggested query 730a, 730b to be a subset of the results 726 that are responsive to the original query 720.

Each suggested query 730a, 730b can include an additional second limitation 732a, 732b representing one or more identified common characteristics that have scores satisfying a threshold. If no common characteristic has a score that satisfies a threshold, then no second limitation based on common characteristics is included in the suggested queries. The respective second limitations 732a, 732b can be a keyword or non-keyword limitation. In some implementations, each second limitation 732a, 732b is selected based on a property of the first limitation 731a, 731b, and thus the second limitations 732a, 732b can be different for different queries 730a, 730b.

In some implementations, the server system 704 generates at least one suggested query 730a in response to each query received. The suggested query 730a can include a particular first limitation 731a, regardless of the content of the query 720 and the results 726 to the received query 720. In the example, the server system 704 generates a suggested query 730a that includes a limitation 731a restricting a publication date to be within the current year.

The server system 704 can generate one or more other suggested queries that have a first limitation that represents one of the common characteristics. In particular, suggested queries can be provided when a common characteristic is a document type or a document collection. In the example, the server system 704 determines as a common characteristic that multiple results 726 correspond to resources identified as "news" resources. The server system 704 counts the results corresponding to resources that are marked as "news" resources and determines that the count satisfies a threshold. As a result, the server system 704 generates a suggested query 730b that includes a first limitation restricting a document type to "news" resources.

In some implementations, the server system 704 generates one or more suggested queries based on identified combinations of common characteristics that occur together. A suggested query including limitations representing a combination of common characteristics can be generated when a count of the highly-ranked results or corresponding resources having the combination of characteristics satisfies a threshold, and at least one of the limitations corresponding to one of the common characteristics is a non-keyword limitation. For example, the server system 704 can count the number of results 726 in which the keyword terms "nuclear" and "proliferation" occur as a phrase in a title and correspond to resources identified as "news" resources. The server system 704 provides the suggested query 730b when the count satisfies a threshold. In some implementations, the user selects a suggested query from displayed suggested queries. Each suggested query can be based on a combination of the first and second limitations.

During state (F), in a response 740 to the query 720, the server system 704 provides the results 726 to the query 720 and the suggested queries 730a, 730b. During state (G), the client device 702 displays the results 726 and the suggested queries 730a, 730b on the user interface 750b.

Figure 8:
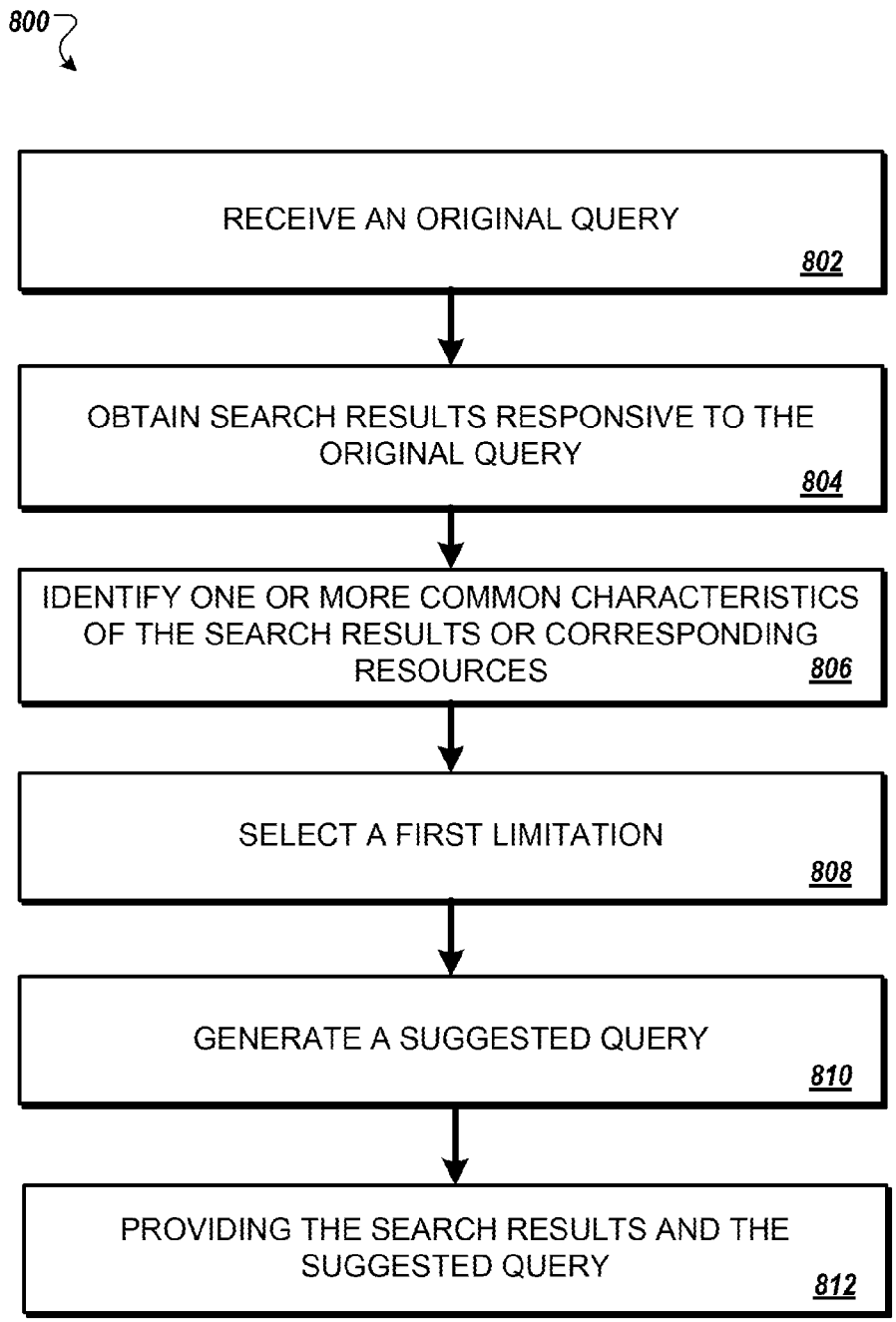
FIG. 8 is a flow chart illustrating another example process for query modification.

FIG. 8 is flow chart illustrating another example process 800 for query modification.

An original query is received (802). Search results responsive to the original query are obtained (804).

One or more common characteristics of the search results or corresponding resources are identified (806). Highly-ranked results of the search results can be selected as described above, and one or more common characteristics of the highly-ranked search results or corresponding resources can be identified. The one or more common characteristics identified can be one or more common characteristics shared by two or more resources, where each of the two or more resources corresponds to a different highly-ranked result of the search results.

A first limitation not included in the original query is selected (808). The first limitation can be a non-keyword limitation, and can be a limitation that is not expressed in a keyword string of the suggested query. The first limitation can require a search engine performing a search based on the original query to identify results that each reference a corresponding resource of a particular document type or a resource from a particular document collection. The first limitation can constrain a time, a date, a document type, a media type, a language, an author, a publisher, a number of links or citations, or a geographical region of resources corresponding to results responsive to the original query.

A suggested query comprising the original query, the first limitation, and a second limitation representing the one or more common characteristics is generated (810). The second limitation can require results to the suggested query to each reference a corresponding resource having the one or more common characteristics.

Scores can be generated for each of the one or more common characteristics based on a count of results of the plurality of highly-ranked results that reference a corresponding resource having the one or more common characteristics. It can be determined that one or more of the scores satisfy a threshold. The second limitation can represent a characteristic of the one or more common characteristics that has a score that satisfies the threshold. In some implementations, the first limitation can be selected to represent a characteristic of the one or more common characteristics that has a score that satisfies the threshold.

The one or more common characteristics can include a first common characteristic, and a second common characteristic. Selecting a first limitation can include selecting a first limitation that represents the first common characteristic. The second limitation can represent the second common characteristic.

A score can be generated based on a count of the two or more resources have the first common characteristic and the second characteristic. It can be determined that the score satisfies a threshold. Selecting a first limitation that represents the first common characteristic can occur in response to determining that the score satisfies the threshold.

The search results and information indicating the suggested query are provided in a response to the original query (812).

The process 800 can also include additional features described with respect to the processes 300, 600 and the systems 100, 400, 700 described above.

A number of implementations have been described. Nevertheless, it will be understood that various modifications may be made consistent with this specification.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments can be implemented in a computing system that includes a back end component, e.g., as a data server, or that includes a middleware component, e.g., an application server, or that includes a front end component, e.g., a client computer having a graphical user interface or a web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the techniques described herein or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments have been described. Other embodiments are within the scope of the following claims. For example, the steps recited in the claims can be performed in a different order and still achieve desirable results.

What is claimed is:

1. A computer-implemented method, comprising:
   receiving an original query including a first limitation that constrains a search;
   modifying the original query to obtain a modified query in which the first limitation that constrains the search has been omitted;
   obtaining, from a search engine system, first search results responsive to the modified query, wherein the first search results have an associated ranking determined by the search engine system, and wherein each of the first search results refers to a respective resource;
   identifying one or more common characteristics shared by two or more resources, each of the two or more resources corresponding to a different highly-ranked result of the first search results;
   generating a second modified query comprising the original query and a second limitation representing the one or more common characteristics, the second limitation requiring results responsive to the second modified query to reference a resource having the one or more common characteristics;
   obtaining second search results responsive to the second modified query, wherein each of the second search results refers to a resource having the one or more common characteristics; and
   providing the second search results in a response to the original query.

2. The computer-implemented method of claim 1, wherein the first limitation requires a search engine performing a search based on the original query to identify results that each reference a corresponding resource of a particular document type or a resource from a particular document collection.

3. The computer-implemented method of claim 1, wherein generating a second modified query comprises:
   generating scores for each of the one or more common characteristics based on a count of results of the plurality of highly-ranked results that reference a corresponding resource having the one or more common characteristics; and
   determining that one or more of the scores satisfy a threshold.

4. The computer-implemented method of claim 1, wherein the first limitation constrains a time, a date, a document type, a media type, a language, an author, a publisher, a number of links or citations, or a geographical region of resources corresponding to results responsive to the original query.

5. The computer-implemented method of claim 1, wherein generating a second modified query comprises selecting the second limitation based on a property of the first limitation.

6. The computer-implemented method of claim 1, wherein generating a second modified query comprises automatically generating the second modified query, without receiving a request to add the second limitation.

7. The computer-implemented method of claim 1, wherein the one or more characteristics include a plurality of characteristics,
   and wherein generating a second modified query comprises generating the second modified query comprising the original query, the second limitation, and a third limitation, the second limitation and the third limitation representing different characteristics of the plurality of characteristics.

8. The computer-implemented method of claim 1, further comprising identifying one or more common characteristics shared by two or more highly-ranked results of the first search results;
   wherein generating a second modified query comprising the original query and a second limitation representing the one or more common characteristics comprises generating a second modified query comprising:
      the original query,
      a second limitation representing the one or more common characteristics shared by the two or more resources, and a third limitation representing the one or more common characteristics shared by the two or more highly-ranked results.

9. The method of claim 1, further comprising selecting, based on the ranking determined by the search engine system, a predetermined number of search results from the first search results as a subset of the first search results;
wherein identifying one or more common characteristics shared by two or more resources comprises identifying one or more common characteristics shared by multiple resources referred to by at least one search result in the subset.

10. A system comprising:
one or more computers and one or more storage devices storing instructions that are operable, when executed by the one or more computers, to cause the one or more computers to perform operations comprising:
receiving an original query including a first limitation that constrains a search;
modifying the original query to obtain a modified query in which the first limitation that constrains the search has been omitted;
obtaining, from a search engine system, first search results responsive to the modified query, wherein the first search results have an associated ranking determined by the search engine system, and wherein each of the first search results refers to a respective resource;
identifying one or more common characteristics shared by two or more resources, each of the two or more resources corresponding to a different highly-ranked result of the first search results;
generating a second modified query comprising the original query and a second limitation representing the one or more common characteristics, the second limitation requiring results responsive to the second modified query to reference a resource having the one or more common characteristics;
obtaining second search results responsive to the second modified query, wherein each of the second search results refers to a resource having the one or more common characteristics; and
providing the second search results in a response to the original query.

11. The system of claim 10, wherein the first limitation requires a search engine performing a search based on the original query to identify results that each reference a corresponding resource of a particular document type or a resource from a particular document collection.

12. The system of claim 10, wherein generating a second modified query comprises:
generating scores for each of the one or more common characteristics based on a count of results of the plurality of highly-ranked results that reference a corresponding resource having the one or more common characteristics; and
determining that one or more of the scores satisfy a threshold.

13. The system of claim 10, wherein the first limitation constrains a time, a date, a document type, a media type, a language, an author, a publisher, a number of links or citations, or a geographical region of resources corresponding to results responsive to the original query.

14. The system of claim 10, wherein generating a second modified query comprises selecting the second limitation based on a property of the first limitation.

15. The system of claim 10, wherein generating a second modified query comprises automatically generating the second modified query, without receiving a request to add the second limitation.

16. The system of claim 10, wherein the one or more characteristics include a plurality of characteristics,
and wherein generating a second modified query comprises generating the second modified query comprising the original query, the second limitation, and a third limitation, the second limitation and the third limitation representing different characteristics of the plurality of characteristics.

17. The system of claim 10, wherein the operations further comprise identifying one or more common characteristics shared by two or more highly-ranked results of the first search results;
wherein generating a second modified query comprising the original query and a second limitation representing the one or more common characteristics comprises generating a second modified query comprising:
the original query,
a second limitation representing the one or more common characteristics shared by the two or more resources, and
a third limitation representing the one or more common characteristics shared by the two or more highly-ranked results.

18. The system of claim 10, wherein the operations further comprise selecting, based on the ranking determined by the search engine system, a predetermined number of search results from the first search results as a subset of the first search results;
wherein identifying one or more common characteristics shared by two or more resources comprises identifying one or more common characteristics shared by multiple resources referred to by at least one search result in the subset.

19. A computer storage medium encoded with a computer program, the program comprising instructions that when executed by one or more computers cause the one or more computers to perform operations comprising:
receiving an original query including a first limitation that constrains a search;
modifying the original query to obtain a modified query in which the first limitation that constrains the search has been omitted;
obtaining, from a search engine system, first search results responsive to the modified query, wherein the first search results have an associated ranking determined by the search engine system, and wherein each of the first search results refers to a respective resource;
identifying one or more common characteristics shared by two or more resources, each of the two or more resources corresponding to a different highly-ranked result of the first search results;
generating a second modified query comprising the original query and a second limitation representing the one or more common characteristics, the second limitation requiring results responsive to the second modified query to reference a resource having the one or more common characteristics;
obtaining second search results responsive to the second modified query, wherein each of the second search results refers to a resource having the one or more common characteristics; and
providing the second search results in a response to the original query.

20. The computer storage medium of claim 19, wherein the first limitation requires a search engine performing a search based on the original query to identify results that each reference a corresponding resource of a particular document type or a resource from a particular document collection.

21. The computer storage medium of claim 19, wherein generating a second modified query comprises:
   generating scores for each of the one or more common characteristics based on a count of results of the plurality of highly-ranked results that reference a corresponding resource having the one or more common characteristics; and
   determining that one or more of the scores satisfy a threshold.

22. The computer storage medium of claim 19, wherein the first limitation constrains a time, a date, a document type, a media type, a language, an author, a publisher, a number of links or citations, or a geographical region of resources corresponding to results responsive to the original query.

23. The computer storage medium of claim 19, wherein generating a second modified query comprises selecting the second limitation based on a property of the first limitation.

24. The computer storage medium of claim 19, wherein generating a second modified query comprises automatically generating the second modified query, without receiving a request to add the second limitation.

25. The computer storage medium of claim 19, wherein the one or more characteristics include a plurality of characteristics,
   and wherein generating a second modified query comprises generating the second modified query comprising the original query, the second limitation, and a third limitation, the second limitation and the third limitation representing different characteristics of the plurality of characteristics.

26. The computer storage medium of claim 19, wherein the operations further comprise identifying one or more common characteristics shared by two or more highly-ranked results of the first search results;
   wherein generating a second modified query comprising the original query and a second limitation representing the one or more common characteristics comprises generating a second modified query comprising:
   the original query,
   a second limitation representing the one or more common characteristics shared by the two or more resources, and
   a third limitation representing the one or more common characteristics shared by the two or more highly-ranked results.

27. The computer storage medium of claim 19, wherein the operations further comprise selecting, based on the ranking determined by the search engine system, a predetermined number of search results from the first search results as a subset of the first search results;
   wherein identifying one or more common characteristics shared by two or more resources comprises identifying one or more common characteristics shared by multiple resources referred to by at least one search result in the subset.

* * * * *